United States Patent
Neubauer (10) Patent No.: US 11,208,273 B2
(45) Date of Patent: Dec. 28, 2021

(54) METHOD AND DEVICE FOR TRANSPORTATION

(71) Applicant: Krones AG, Neutraubling (DE)

(72) Inventor: Michael Neubauer, Grassau (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 16/933,051

(22) Filed: Jul. 20, 2020

(65) Prior Publication Data

US 2021/0016980 A1    Jan. 21, 2021

(30) Foreign Application Priority Data

Jul. 18, 2019 (DE) .......................... 102019119497.0

(51) Int. Cl.
*B65G 54/02* (2006.01)
*H02K 11/215* (2016.01)
*H02K 41/03* (2006.01)

(52) U.S. Cl.
CPC ........... *B65G 54/02* (2013.01); *H02K 11/215* (2016.01); *H02K 41/031* (2013.01); *B65G 2201/0247* (2013.01); *B65G 2203/0291* (2013.01)

(58) Field of Classification Search
CPC B65G 54/02; B65G 43/00; B65G 2203/0291; B65G 2201/0247; H02K 11/215; H02K 41/031; H02K 41/03; H02P 25/06
USPC ........................................................ 198/805
See application file for complete search history.

(56) References Cited

U.S. PATENT DOCUMENTS

| | | | |
|---|---|---|---|
| 6,191,507 B1 * | 2/2001 | Peltier | B65G 54/02 310/12.02 |
| 6,876,107 B2 | 4/2005 | Jacobs | |
| 10,454,355 B2 | 10/2019 | Weber et al. | |
| 2015/0321857 A1 | 11/2015 | Sacchetti et al. | |

(Continued)

FOREIGN PATENT DOCUMENTS

| | | | | |
|---|---|---|---|---|
| CA | 3009902 | * | 12/2018 | ............. H02K 41/02 |
| CN | 207226352 U | | 4/2018 | |

(Continued)

OTHER PUBLICATIONS

English-language Abstract of DE 10158763 A1 (2003).

(Continued)

*Primary Examiner* — James R Bidwell
(74) *Attorney, Agent, or Firm* — Caesar Rivise, PC (57) ABSTRACT

A device and a plurality of methods for transporting are disclosed. One method includes moving a plurality of transport movement devices (14) along a guide track (22) by use of a linear motor system. A long stator (16) of the linear motor system has, along a portion of the guide track (22), a predetermined functional region. The method includes portion-wise varying of a magnetic field generation of the long stator (16) within the predetermined functional region (46) for successive transport movement devices of the plurality of transport movement devices (14). It is thus possible to achieve various advantages, such as for example prolonging the motor service life, preventing emergency shut-offs, increased performance of the long stator linear motor and/or allowing smaller dimensioning of the long stator (16).

18 Claims, 5 Drawing Sheets

(56) References Cited

U.S. PATENT DOCUMENTS

| | | | |
|---|---|---|---|
| 2015/0349618 A1* | 12/2015 | Kleinikkink | H02K 41/0358 |
| | | | 310/12.19 |
| 2017/0179806 A1* | 6/2017 | Lu | H02K 41/02 |
| 2019/0061558 A1 | 2/2019 | Craver | |

FOREIGN PATENT DOCUMENTS

| | | |
|---|---|---|
| CN | 108328249 A | 7/2018 |
| CN | 109217768 A | 1/2019 |
| DE | 10158763 A1 | 7/2003 |
| EP | 2747257 A2 | 6/2014 |
| EP | 2779432 | 9/2014 |
| WO | 2006077511 A1 | 7/2006 |
| WO | 2019101988 A1 | 5/2019 |

OTHER PUBLICATIONS

Bahnen et al., "Novel and advanced web systems II Exercise: Linear Machines", Irl Institute for Land and Sea Transport, 113 pages (2005).
English abstract for CN 108328249 A (2018).
English abstract for CN 207226352 U (2018).

\* cited by examiner

METHOD AND DEVICE FOR TRANSPORTATION

TECHNICAL FIELD

The invention relates to a method and to a device for transporting, preferably for transporting containers in a container treatment installation.

TECHNICAL BACKGROUND

A current development trend in the transport of containers, such as for example bottles or cans, in installations and machines for the production, filling and packaging of beverages and liquid foodstuffs is the linear motor technique, for example in the form of long stator linear motor systems or short stator linear motor systems. In the case of a long stator linear system, a positionally fixed long stator having electromagnets can be used to bring about a movement of the movement devices equipped with permanent magnets. In the case of short stator linear motor systems, by contrast, the movement devices can each have a short stator which is formed by electromagnets and which, for moving the movement device, can come into magnetic interaction with positionally fixed permanent magnets.

A major advantage of the linear motor technique lies in the fact that the movement devices or shuttles can be activated separately and independently of one another. It is thus possible to operate with different speed profiles. Conventionally, each movement device uses the same movement profile over the path. Therefore, for all movement devices, acceleration occurs for example always at the same point of the long stator linear motor system. A large power is thus required at this point, which on account of the efficiency <1, depending on the motor design, entails a not inconsiderable heat development.

US 2015/0321857 A1 discloses a unit for sequencing and guiding objects, in which the objects are grouped into batches of one or more objects. The unit comprises a first conveyor for conveying the objects from an input station to an output station and a sequencing device interacting with the objects in order to form the batches and to move them to the output station. The sequencing device comprises a second conveyor which comprises a rail and a plurality of movable elements. The rail accommodates a stator armature which is formed from a plurality of individually excitable magnets. The movable elements comprise corresponding carriages which receive corresponding permanent magnets and are moved independently along the rail by the magnets being individually controlled. The carriages can be moved with different position, speed and acceleration profiles along the path.

It can be a disadvantage of the known prior art that a long stator can have regions with (excessively) high thermal loading. For example, a plurality of movement devices or, in the case of rigid movement profiles, even all movement devices can be accelerated or decelerated at the same points of the long stator. Some parts of the long stator can thus be very much more strongly thermally loaded than others. Particularly in regions having large accelerations or decelerations, there prevails a large power requirement and, associated therewith, a large heat development. If this thermal loading exceeds a certain value, problems can arise, such as for example reduction in the long stator service life, emergency shut-off as a result of overheating of temperature-critical components or a reduced performance of the long stator linear motor system. A related problem can occur in short stator linear motor systems, since here the short stator is always energized if for example a positive or negative acceleration is intended or a speed is to be maintained. In the case of many successive acceleration operations, for example, the short stator can heat to an undesirably strong degree.

The object on which the invention is based is to provide an alternative and/or improved technique for transporting by means of a linear motor system, preferably a long stator linear motor system or a short stator linear motor system.

SUMMARY OF THE INVENTION

The object is achieved by the features of the independent claims. Advantageous developments are specified in the dependent claims and the description.

The invention provides a method for transporting, preferably for transporting objects (for example in logistics centers for foodstuff transport, in libraries, etc.), particularly preferably containers or (container) multipacks (for example bottles, cans etc.) and/or for a container treatment installation (for example for producing, cleaning, checking, filling, sealing, labelling, grouping, printing and/or packaging containers for liquid media, preferably beverages or liquid foodstuffs). The method comprises moving a plurality of transport movement devices along a guide track (for example guide rail, guide slot, runway, etc.) by means of a linear motor system (for example by means of at least one guide element per transport movement device). A long stator of the linear motor system has, along a portion of the guide track, a predetermined (for example in terms of control) functional region (for example positive or negative acceleration region or speed-maintaining region) in which a function assigned to the predetermined functional region is carried out with respect to influencing the plurality of transport movement devices. The method comprises portion-wise varying of a magnetic field generation of the long stator (for example by portion-wise different energization of the long stator) within the predetermined functional region for successive (for example directly or indirectly successive) transport movement devices of the plurality of transport movement devices, with the result that preferably a thermal loading of the long stator within the predetermined functional region is reduced at least portion-wise.

The method can preferably allow a situation in which no pointwise acting increased thermal loading of the long stator occurs. Instead, a function which was executed only pointwise hitherto can be expanded to the functional region especially predetermined therefor. For successive transport movement devices, the function is effected in at least partially different portions of the predetermined functional region. The function-associated thermal loading of the long stator can thus be expediently divided over the entire predetermined functional region, instead of acting only pointwise or in a single, comparatively short portion. In other words, the method can comprise a portion-wise reduction in a thermal loading of the long stator in the predetermined functional region by portion-wise varying of the magnetic field generation within the predetermined functional region for successive transport movement devices of the plurality of transport movement devices. It is thus possible to achieve various advantages, such as for example prolonging the motor service life, preventing emergency shut-offs by overheating of temperature-critical components of the long stator linear motor system, increased performance of the long stator linear motor system and/or allowing a smaller design of the long stator.

In one exemplary embodiment, the predetermined functional region is a predetermined acceleration region in which the plurality of transport movement devices are accelerated, preferably positively or negatively. Alternatively, the predetermined functional region can be a predetermined speed-maintaining region in which the one speed of the plurality of transport movement devices is substantially maintained.

In a further exemplary embodiment, the magnetic field generation is varied portion-wise in such a way that the function (for example positive acceleration, negative acceleration, speed-maintaining, etc.) assigned to the predetermined region is maintained.

In a further exemplary embodiment, the magnetic field generation is varied portion-wise in such a way that a thermal loading of the long stator is distributed within the predetermined functional region, preferably substantially uniformly and/or between different portions of the predetermined functional region. It is thus expediently possible for all portions to be subjected to low thermal loading instead of only a single portion being subjected to high thermal loading.

A magnetic field for moving the successive transport movement devices can be expediently generated in substantially all portions of the predetermined functional region.

In one embodiment, the predetermined functional region has a plurality of portions (for example portions which are spaced apart or offset along the guide track and/or portions which at least partially overlap with one another). The magnetic field generation can preferably be varied portion-wise in such a way that a temperature, a power output, a heat generation and/or a thermal loading of the long stator in the plurality of portions in each case remains below a limit value (for example temperature limit value, power output limit value, heat generation limit value, thermal loading limit value). Alternatively or additionally, a temperature, a power output, a heat generation and/or a thermal loading of the long stator in the plurality of portions can be at least partially evened out.

The temperature, the power output, the heat generation and/or the thermal loading of the long stator in the individual portions can expediently be estimated, calculated and/or, for example with a suitable sensor system, detected.

In a further embodiment, the predetermined functional region has a plurality of portions, and the magnetic field generation is varied portion-wise in such a way that the plurality of portions, in each case alternately, undertake the largest magnetic field generation and/or the smallest magnetic field generation (for example in each case for a predetermined time period). Alternatively or additionally, it is possible for example for the plurality of portions, in each case alternately, to have the largest power output and/or the smallest power output (for example in each case for a predetermined time period). Since the magnetic field generation and the power output correlate with the thermal loading, a thermal loading can be distributed over the portions. It is expediently possible for all portions to alternately experience a temporary low thermal loading on account of the smallest magnetic field generation/the smallest power output for cooling. It is additionally possible for all portions to alternately experience only temporary high thermal loading on account of the largest magnetic field generation/the largest power output in order as far as possible not to realize, or barely to realize, the disadvantages associated with the high thermal loading.

In a further embodiment, the predetermined functional region has a plurality of portions, and the magnetic field generation is varied portion-wise in such a way that the variation of the magnetic field generation in the plurality of portions migrates (for example dynamically), preferably rolls and/or occurs alternately successively in a direction towards an end of the predetermined functional region and in a direction towards a start of the predetermined functional region. It is possible that the variation of the magnetic field generation in the plurality of portions occurs in a predetermined order. This can ensure for example that all portions contribute to dividing the thermal loading in the predetermined functional region.

In one embodiment, a speed of the plurality of transport movement devices at a start of the predetermined functional region is substantially identical, and/or a speed of the plurality of transport movement devices at an end of the predetermined functional region is substantially identical. It is thus possible for example, in spite of different influencing of the plurality of transport movement devices within the predetermined functional region, to ensure that ultimately all transport movement devices have the same speed at the end.

In one embodiment variant, the magnetic field generation is varied portion-wise in such a way that the successive transport movement devices are accelerated (for example positively or negatively) in in each case different portions of the predetermined functional region. It is possible that the successive transport movement devices experience their respectively strongest (for example positive or negative) acceleration in in each case different portions of the predetermined functional region.

It is expediently possible for the successive transport movement devices to be accelerated in each case only in one or some portions of the predetermined functional region. Alternatively, the successive transport movement devices can be accelerated for example in all portions of the predetermined functional region, although they are at least partially in each case accelerated to different degrees in the individual portions.

In a further embodiment variant, the magnetic field generation is varied portion-wise in such a way that the successive transport movement devices have at least partially different, path-related acceleration profiles in the predetermined functional region.

In one exemplary embodiment, the predetermined functional region is formed by a plurality of successive long stator segments of the long stator, and each long stator segment forms a respective portion of the predetermined functional region. The thermal loading can thus in each case be divided between the long stator segments.

It is expediently possible for the long stator segments to be separate components and/or to be arranged adjoining one another along the guide track.

In one exemplary embodiment, the predetermined functional region is a predetermined functional region common to the plurality of transport movement devices.

In a further exemplary embodiment, the predetermined functional region has a predetermined start, a predetermined end, a predetermined position, a predetermined length and/or a predetermined course.

In one embodiment, the magnetic field generation is varied portion-wise in such a way that a thermal overloading of a portion or of all portions of the long stator within the predetermined functional region is delayed or ruled out.

For example, what can be understood herein by a thermal overloading is a situation in which the portion of the long stator is operated outside of its permissible operating limits and/or an emergency shut-off of the portion of the long stator occurs.

In a further embodiment, the predetermined functional region has an increased thermal loading and/or an increased power requirement on account of the magnetic field generation of the long stator for interacting with the plurality of transport movement devices (for example for positively or negatively accelerating the plurality of transport movement devices).

Expediently, what can be understood herein by a region having an increased thermal loading/heat development is a region which, by comparison with the remaining (functional) regions of the long stator, has a higher thermal loading and/or a larger power requirement. For example, the thermal loading and/or the power requirement can be larger than the average (for example arithmetic mean, median, etc.) of the thermal loadings or the power requirements of the remaining (functional) regions of the long stator.

It is possible for example that the predetermined functional region has for example a first portion, a second portion and optionally a third portion. A first transport movement device can be accelerated only in the first portion. A second transport movement device can be accelerated only in the second portion. An optional third transport movement device can be accelerated only in the third portion.

Alternatively, it is possible for example for the first transport movement device to be accelerated strongest in the first portion, for the second transport movement device to be accelerated strongest in the second portion, and optionally for the third transport movement device to be accelerated strongest in the third portion.

The invention also relates to a method for transporting, preferably for transporting objects (for example in logistics centers, for foodstuff transport, in libraries, etc.), particularly preferably containers or (container) multipacks (for example bottles, cans, etc.), and/or for a container treatment installation (for example for producing, cleaning, checking, filling, sealing, labelling, grouping, printing and/or packaging containers for liquid media, preferably beverages or liquid foodstuffs). The method comprises moving at least one transport movement device along a guide track by means of a linear motor system, wherein the at least one transport movement device has a short stator, which is subdivided into a plurality of portions, of the linear motor system. The method comprises portion-wise varying of a magnetic field generation (for example by portion-wise different energization) over the plurality of portions of the short stator in (for example directly or indirectly) successive time intervals for carrying out an identical function with respect to moving at least one transport movement device, with the result that preferably a thermal loading of the short stator is reduced at least portion-wise. The method can allow the achievement of identical or at least similar advantages to those specified herein for the long stator linear motor system.

The portions of the short stator, for example along a longitudinal direction, direction of forward travel and/or vertical direction of the at least one transport movement device, can expediently be arranged so as to be spaced apart or offset and/or to at least partially overlap with one another.

In one exemplary embodiment, the identical function is a, preferably positive or negative, acceleration function or a speed-maintaining function.

In a further exemplary embodiment, the plurality of portions of the short stator can be or are energized independently of one another.

In a preferred exemplary embodiment, the plurality of portions have a first portion and a second portion. The portion-wise varying of the magnetic field generation can preferably occur in such a way that, in successive time intervals for carrying out the identical function, initially the first portion is activated and the second portion is deactivated and subsequently the first portion is deactivated and the second portion is activated. Alternatively or additionally, the portion-wise varying of the magnetic field generation can occur for example in such a way that, in successive time intervals for carrying out the identical function, initially the first portion is more strongly energized than the second portion and subsequently the second portion is more strongly energized than the first portion.

In one embodiment, the magnetic field generation is varied portion-wise in such a way that at least one of the following features is satisfied: a thermal loading of the short stator is distributed over the plurality of portions, preferably substantially uniformly; a temperature, a power output, a heat generation and/or a thermal loading of the short stator remains in the plurality of portions in each case below a limit value; a temperature, a power output, a heat generation and/or a thermal loading of the short stator is at least partially evened out in the plurality of portions; the plurality of portions undertake, in each case alternately, the largest magnetic field generation and/or the smallest magnetic field generation; the plurality of portions have, in each case alternately, the largest power output and/or the smallest power output; the variation of the magnetic field generation migrates, preferably rolls, in the plurality of portions; the variation of the magnetic field generation in the plurality of portions occurs in a predetermined order; and a thermal overloading of a portion or all portions of the short stator is delayed or ruled out.

The temperature, the power output, the heat generation and/or the thermal loading of the short stator in the individual portions can expediently be estimated, calculated and/or, for example with a suitable sensor system, detected.

The invention also relates to a device for transporting, preferably for transporting objects, preferably containers (for example bottles, cans, etc.) or (container) multipacks and/or for a container treatment installation. The device has a guide track and one or more transport movement devices which can be guided along the guide track. The device has a linear motor system. The linear motor system has a long stator which is arranged along the guide track and is designed for driving the plurality of transport movement devices. Alternatively, the linear motor system has one or more short stators which is included in the one transport movement device or which are included in the plurality of transport movement devices for driving along the guide track. The device has a control unit which is configured to carry out a method for transporting as disclosed herein. The device can expediently achieve the same advantages as the method disclosed herein.

In a further embodiment, the one or more transport movement devices have a holder which is designed for holding a (for example single) container, wherein preferably the holder is configured as a container neck holder or a container body holder.

The term "control unit" can preferably refer to an electronic device which, depending on the design, can perform control tasks and/or regulating tasks. Even though the term "control" is used herein, this can as it were expediently also encompass "regulation" or "control with feedback".

The above-described preferred embodiments and features of the invention can be combined with one another in any desired manner.

BRIEF DESCRIPTION OF THE FIGURES

Further details and advantages of the invention are described below with reference to the appended drawings, in which.

The embodiments shown in the figures at least partially correspond to one another, and therefore similar or identical parts are provided with the same reference signs, and the explanation thereof also involves reference to the description of the other embodiments or figures in order to avoid repetitions.

DETAILED DESCRIPTION OF EXEMPLARY EMBODIMENTS

Figure 1:
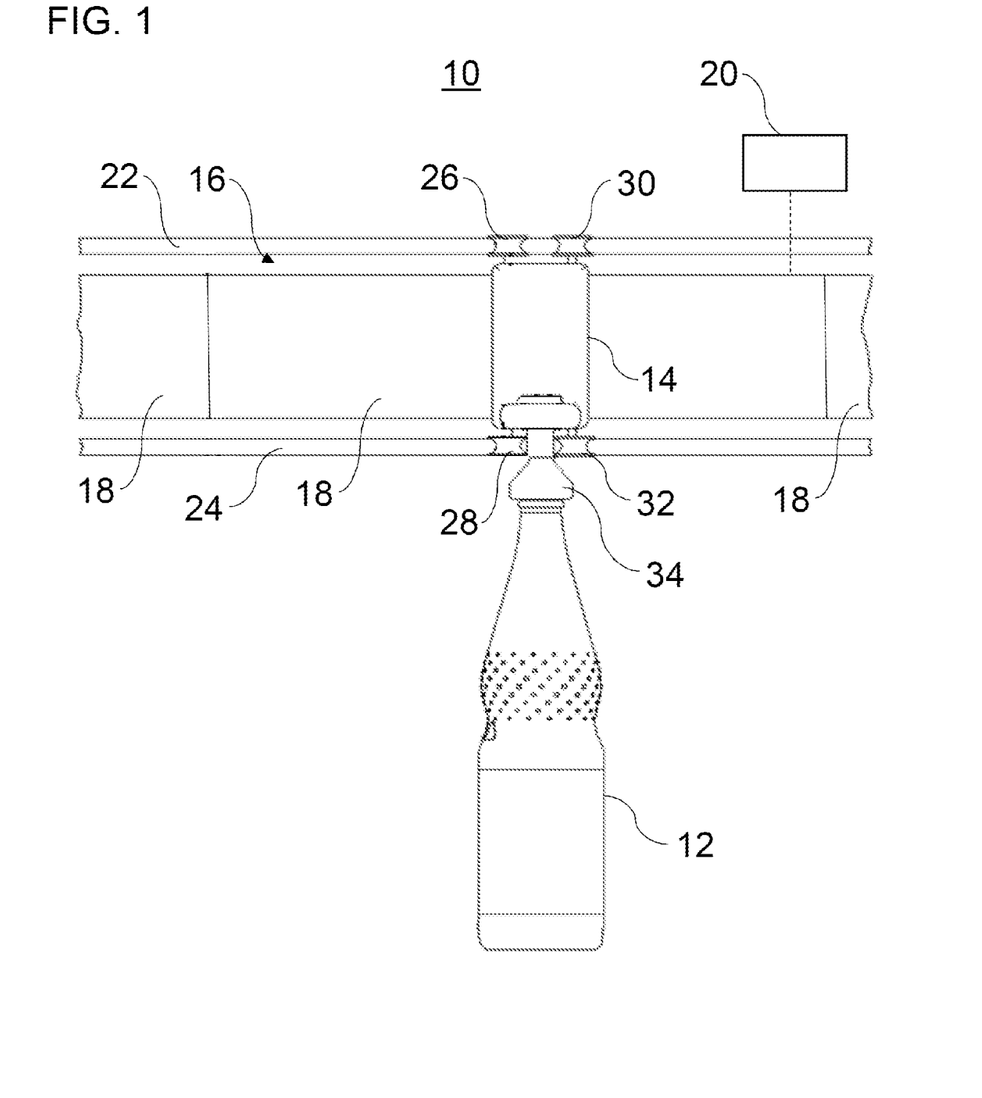
FIG. 1 shows a schematic view of a device for transporting containers according to one exemplary embodiment of the present disclosure.

FIG. 1 shows a device 10 for transporting containers (for example bottles, cans, preforms and/or other containers) 12 or multipacks (six-packs, four-packs, etc.) by means of a plurality of transport movement devices 14. For reasons of clarity, only one container 12 and only one movement device 14 are illustrated in FIG. 1.

The transport movement devices 14 can be driven by means of a long stator linear motor technique. For this purpose, the device 10 has a long stator 16. The long stator 16 has a plurality of long stator segments 18. The long stator segments 18 are arranged next to one another, preferably adjoining one another. The long stator segments 18 can, by way of their electromagnets, enter into magnetic interactions with permanent magnets (not shown separately) of the transport movement devices 14 for propelling the transport movement devices 14. The long stator 16 with its long stator segments 18 and the magnets of the transport movement devices 14 thus form a so-called long stator linear motor system. The long stator segments 18 can be operated individually by means of a control unit 20 (shown only schematically in FIG. 1). That is to say that the control unit 20 can operate the long stator segments 18 individually and independently of one another. The long stator 16 and the transport movement devices 14 are spaced apart from one another by an air gap. Alternatively, the linear motor system can for example be also a short stator linear motor system, as is described by way of example with reference to FIG. 5.

FIG. 1 shows an exemplary embodiment in which the device 10 has two guide tracks 22 and 24. The first guide track 22 runs parallel to the second guide track 24. The first guide track 22 is arranged above the second guide track 24. The long stator segments 18 are arranged between the guide tracks 22, 24. The long stator segments 18 extend parallel to the guide tracks 22, 24. The guide tracks 22, 24 can be configured for example as guide rails, guide slots or runways. The guide tracks 22, 24 can run rectilinearly or along track curves. The device 10 can also have more or fewer guide tracks for guiding the transport movement devices 14.

The exemplary transport movement device 14 has four guide elements 26, 28, 30, 32. The first guide element 26 can guide the transport movement device 14 along the first guide track 22, and the second guide element 28 can guide the transport movement device 14 along the second guide track 24. The third and fourth guide elements 30, 32 can be arranged for example for guiding along two further guide tracks (not shown) during a change of guide track of the transport movement device 14. During a change of guide track, the guide elements 26, 28 come out of engagement with the guide tracks 22, 24, and the guide elements 30, 32 can come into engagement with the two further guide tracks. In the exemplary embodiment illustrated, the guide elements 26, 28, 30, 32 are designed as rotatable rollers which can roll on the respective guide tracks. However, it is also possible for the guide elements 26, 28, 30, 32 to be configured in some other way, for example as sliding shoes or sliding skids. Depending on the number and configuration of the guide tracks and dependent on a configuration of the guide elements, the transport movement device 14 can also have more or fewer guide elements. It is also possible that more than one guide element per guide track is provided.

The transport movement device 14 has a holder 34 for holding the container 12. The holder 34 is configured as a container neck holder for holding the container 12 at its container neck. For example, the container neck can be clamped in the holder 34 by means of a clamping holder. However, it is also possible that the holder 34 is configured in some other way, for example as a gripper holder or a suction holder. The holder can act for example on the container neck ("neck-handling") or on the container outer body ("base-handling").

Figure 2:
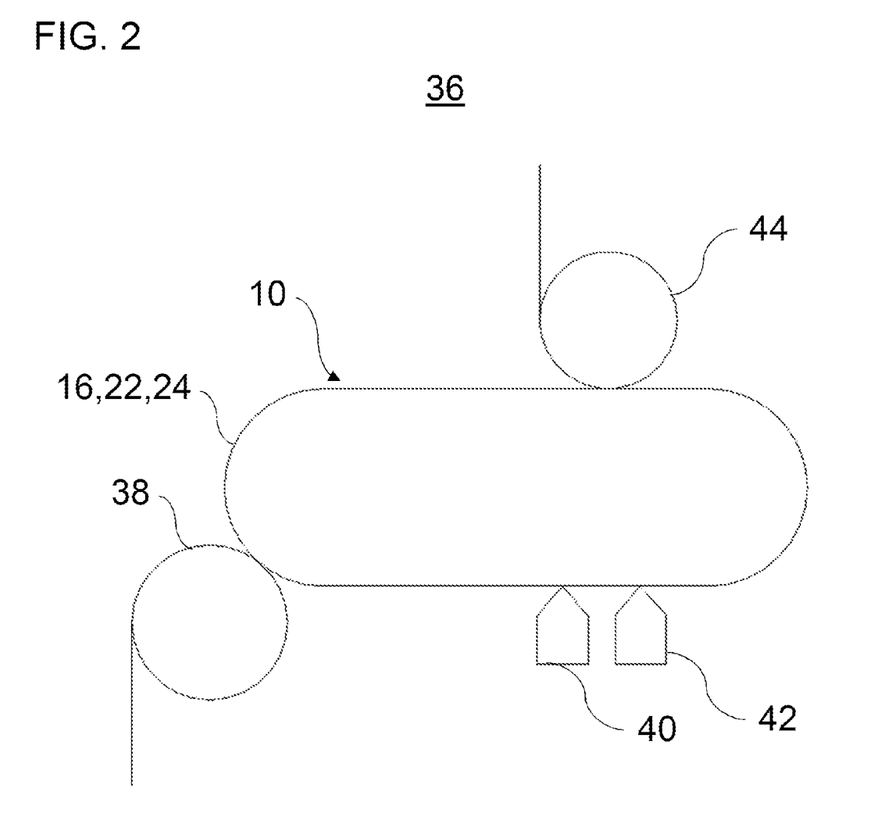
FIG. 2 shows a schematic view of a container treatment installation having the exemplary device for transporting containers.

FIG. 2 shows an exemplary integration of the device 10 in a container treatment installation 36. The container treatment installation 36 is described in more detail below with reference to FIGS. 1 and 2.

The container treatment installation 36 has a rotatable run-in star 38, the device 10, container treatment devices 40, 42 and a rotatable run-out star 44.

The containers can be transferred from the run-in star 38 to the device 10. The device 10 has the guide tracks 22, 24, which are closed. The transport movement devices 14 (not shown in FIG. 2) can circulate on the guide tracks 22, 24. The device 10 can transfer the transported containers to the container treatment devices 40, 42 or can halt the containers for treatment by means of the container treatment devices 40, 42. The container treatment devices 40, 42 can for example clean, check, fill, seal, label and/or print the containers. Downstream of the container treatment devices 40, 42, the containers can be transferred from the device 10 for example to the run-out star 44.

While the containers are being moved by means of the transport movement devices 14 along the guide tracks, they are accelerated and decelerated portion-wise. For example, the transport movement devices 14 are decelerated (negatively accelerated) directly upstream of the container treatment device 40 in order to come to a standstill for treatment at the first container treatment device 40. There can then follow a short positive acceleration with subsequent deceleration of the transport movement devices 14 to reach the second container treatment device 42. Downstream of the second container treatment device 42, the transport movement devices 14 can be accelerated again and finally transferred to the run-out star 44.

According to a conventional technique, all transport movement devices 14 would be accelerated directly downstream of the second container treatment device 42 by the same portion of the long stator 16. In this portion, the long stator 16 would thus have to apply a large power. Particularly if the containers have been filled beforehand by one of the container treatment devices 40, 42 and the container mass has thus become larger, a high power is required. The large power in this portion would lead to an undesired, large heat development in this portion that can for example negatively influence a service life of the long stator 16 in this portion.

In order to prevent or at least alleviate the purely exemplary above scenario, the present disclosure generally proposes that, in portions of the long stator 16 with increased thermal loading, there be carried out a dynamic displacement of the claimed portions for successive transport movement devices. The portion with increased thermal loading is expediently assigned a predetermined functional region of the long stator 16 in which a specific function with respect to the transport movement devices 14 has to be satisfied, for example acceleration of the transport movement devices. According to the technique of the present disclosure, within this predetermined functional region a magnetic field generation is varied in different portions of the predetermined functional function for successive transport movement devices 14. The variation can occur here in such a way that the function assigned to the predetermined functional region is maintained.

Figure 3:
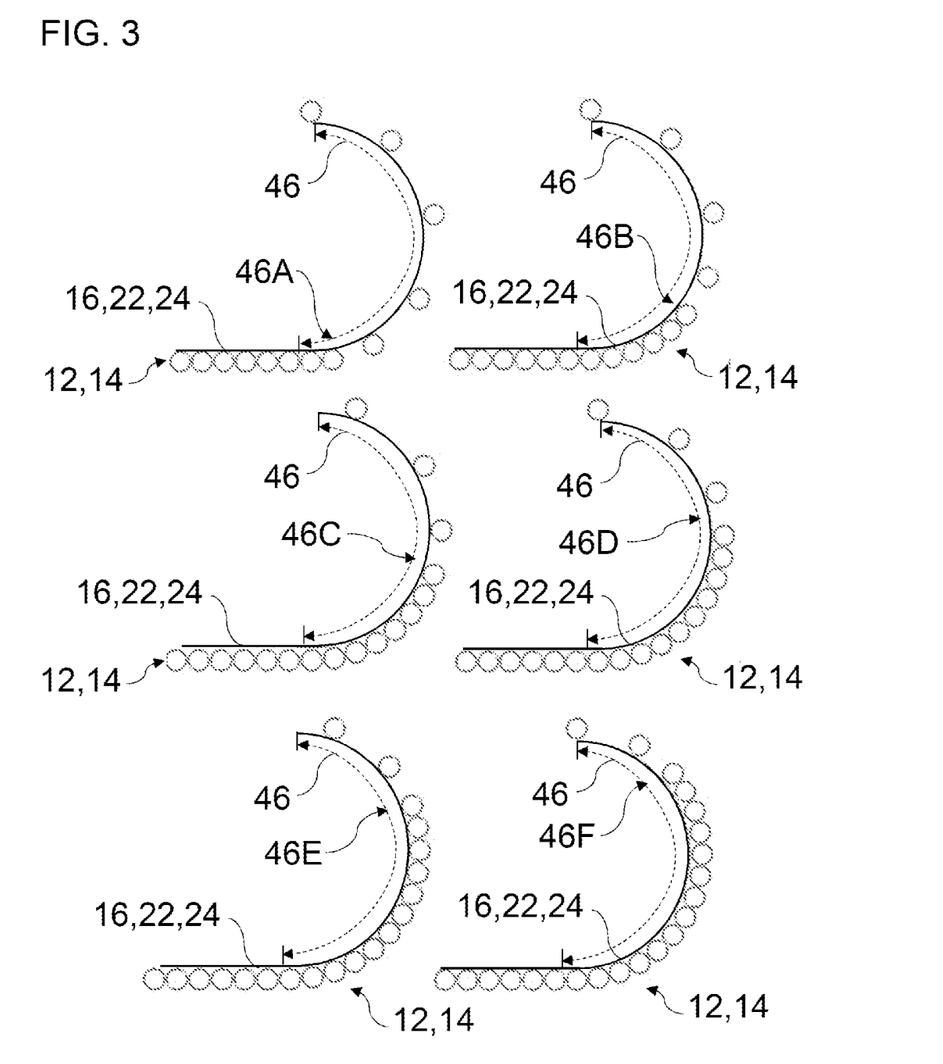
FIG. 3 shows a schematic illustration of a container flow along a predetermined functional region of the exemplary device at different times.

The technique is described in more detail below with reference to FIG. 3. The technique can be implemented as a method or a device. FIG. 3 shows a detail of FIG. 2, namely a region of the device 10 between the second container treatment device 42 and the run-out star 44, at different times. The combination of in each case a transport movement device 14 with the respective container 12 is illustrated as a circle.

The long stator 16 has a predetermined functional region 46 which is arranged between the container treatment device 42 (see FIG. 2) and the run-out star 44 (see FIG. 2). The predetermined functional region 46 can have a predetermined start, a predetermined end, a predetermined length, a predetermined position and/or a predetermined course. At the predetermined start and/or at the predetermined end it is possible for example for all transport movement devices 14 to have the substantially identical speed. The predetermined functional region 46 can expediently apply to all transport movement devices 14.

The predetermined functional region 46 is assigned the function "acceleration", since the containers 12 are intended to be accelerated as far as the run-out star 44. Within the predetermined functional region 46 it is only for successive transport movement devices 14 with the containers 12 that in each case other portions are used for accelerating the transport movement devices 14. Generally formulated, the magnetic field generation is varied portion-wise within the predetermined functional region 46 for successive transport movement devices 14. A thermal loading of the long stator 16 within the predetermined functional region 46 can thus expediently be reduced at least portion-wise. The portion-wise magnetic field variation occurs here such that the function "acceleration" assigned to the predetermined functional region 46 is maintained. Acceleration occurs only in each case in different portions of the predetermined functional region 46.

Starting from top left in FIG. 3, the transport movement devices 14 with the containers 12 are already accelerated in a portion 46A at the start of the predetermined functional region 46. The relatively large division/the relatively large relative distance between the individual transport movement devices 14 with the containers 12 within the entire predetermined functional region 46 indicates that the transport movement devices 14 are moved already shortly after the start of the predetermined functional region 46 at a relatively large speed. At a later time (above right in FIG. 3), the transport movement devices 14 are accelerated first in a portion 46B arranged downstream with respect to the container flow. Initially, the portion 46A has thus experienced a relatively large thermal loading on account of the acceleration of the transport movement devices 14. Thereafter, the portion 46A is unloaded since it has no longer been used for acceleration. Instead, the acceleration occurs in the portion 46B, which accordingly experiences a higher thermal loading. At a later time, the acceleration of the transport movement devices 14 occurs in one of the portions 46C, 46D, 46E and 46F (see middle and lower row in FIG. 3). The acceleration portion migrates or rolls dynamically in succession through the portions 46A-46F (and for example back again for renewed starting). It is expediently possible for an order in which the portions are used for acceleration to be predetermined. The transport movement devices 14 thus have at least partially different, path-related acceleration profiles within the predetermined functional region 46. The portions 46A-46F alternately undertake the largest magnetic field generation. It is thus possible for a thermal loading of the long stator 16 within the predetermined functional region 46 to be divided over the portions 46A-46F. For example, the long stator 16 can be operated by the control unit 20 (see FIG. 1) such that the thermal loading of the long stator 16 with respect to the portions 46A-46F is evened out.

The long stator 16 can expediently be operated with the operating aim of ruling out or at least as far as possible delaying an overloading of a portion or of all portions of the long stator 16 within the predetermined functional region 46. For this purpose, the long stator 16 can for example be operated such that at least one portion-specific parameter is detected or estimated and the operation of the long stator 16 is adapted such that the parameter does not exceed a limit value. Examples of suitable parameters are portion temperature, portion power output, portion heat generation and/or a thermal loading of the respective portion.

Figure 4:
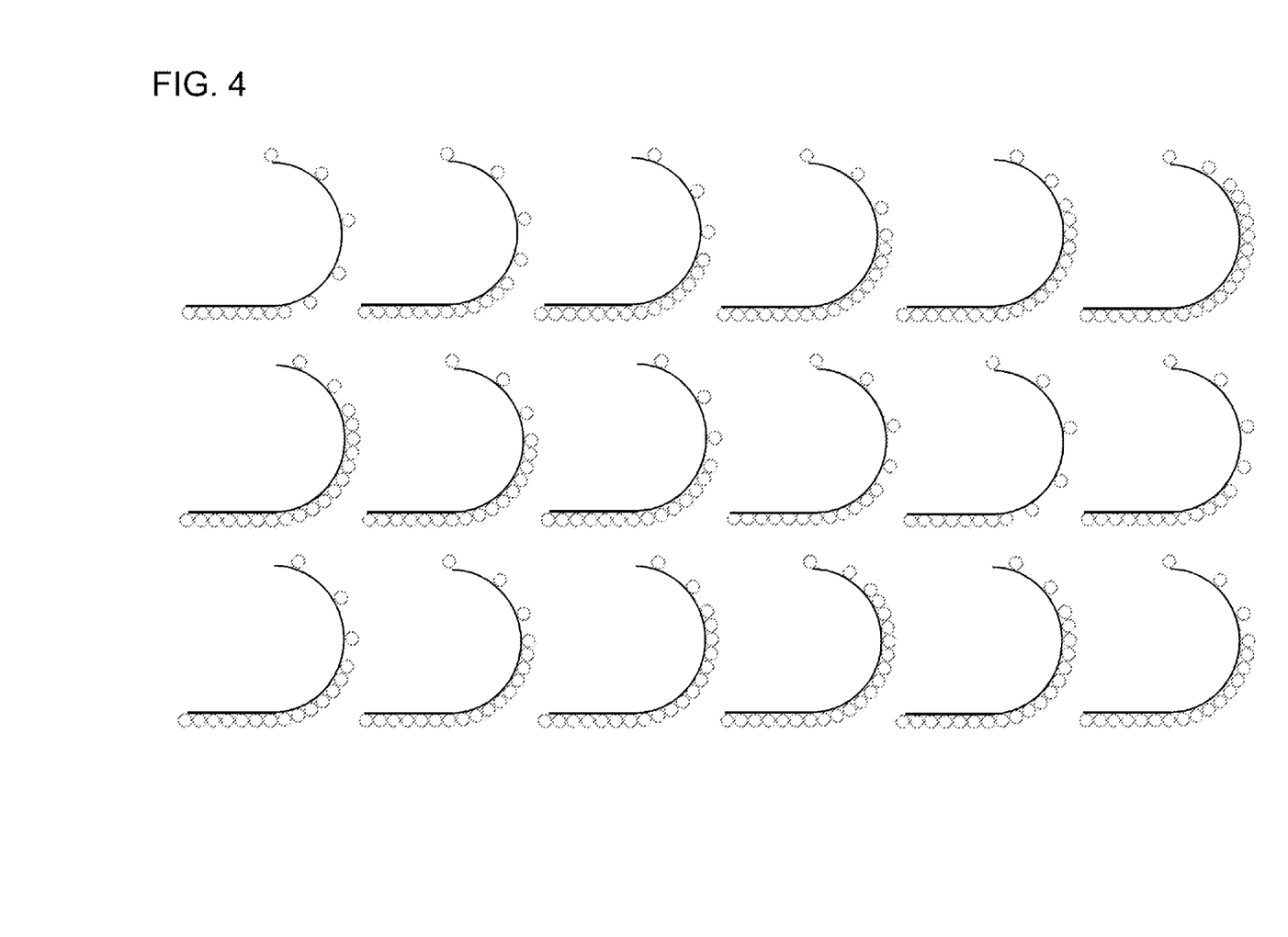
FIG. 4 shows a further schematic illustration of a container flow along a predetermined functional region of the exemplary device at different times.

For reasons of clarity, no reference signs are contained in FIG. 4. However, for better understanding, the mode of illustration and the symbols used follow FIG. 3. FIG. 4 shows for a multiplicity of different times that the transport movement device can in each case be accelerated in different portions within the predetermined region. For example, the acceleration portion can first of all be successively displaced rearward in the direction towards the end of the predetermined functional region (upper row). The acceleration portion can then again be successively displaced in the direction towards the start of the predetermined functional region (middle row) and then again successively in the direction of the end (lower row), etc.

An exemplary embodiment has been described above in which the predetermined functional region is a region for the positive acceleration of the transport movement devices 14. It is also possible that the predetermined functional region has another function, for example deceleration (negative acceleration) of the transport movement devices 14 or maintaining of a speed of the transport movement devices 14. The guide tracks 22, 24 can have any course in the predetermined functional region 46, for example a rectilinear course or a course in the form of a track curve.

For example, the predetermined functional region 46 can be arranged with respect to a container flow (for example directly) downstream of a container-producing device, for example a container blow-molding machine, of the container treatment installation 36 (for example directly) downstream of a pitch reduction star of the container-producing device or (for example directly) upstream of a labelling device of the container treatment installation 36.

Figure 5:
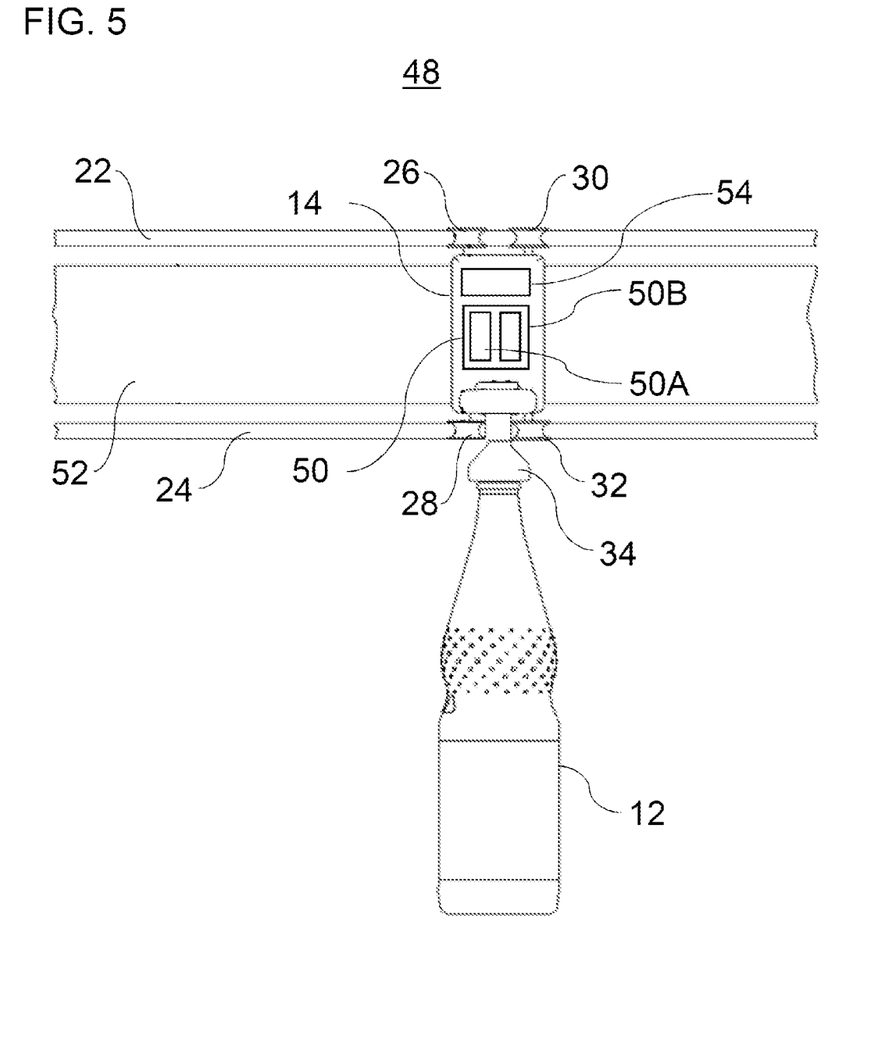
FIG. 5 shows a schematic view of a device for transporting containers according to a further exemplary embodiment of the present disclosure.

FIG. 5 shows a further device 48 for transporting containers (for example bottles, cans and/or other containers) 12 by means of a plurality of transport movement devices 14. For reasons of clarity, only one container 12 and only one movement device 14 are illustrated again in FIG. 5.

The exemplary embodiment of FIG. 5 differs from the exemplary embodiment of FIG. 1 in that, instead of a long stator linear motor system, a short stator linear motor system is used to drive or propel the transport movement device 14.

The transport movement device 14 has a short stator 50. The short stator 50 has at least two portions 50A, 50B which can expediently be activated or energized independently of one another. It is also possible for more than two portions to be included. The portions 50A, 50B can enter into magnetic interaction with permanent magnets 52 arranged along the guide track 22 and/or 24 in order to drive the transport movement device 14. The portions 50A, 50B are arranged spaced apart or offset from one another along a longitudinal direction or a direction of forward travel of the transport movement device 14. It is also possible that the portions 50A, 50B are arranged spaced apart or offset from one another along a height direction of the transport movement device 14 or a vertical direction. The portions 50A, 50B can for example also at least partially overlap.

In order to prevent excessive heating of the short stator 50, the portions 50A, 50B can for example be alternately energized or activated and deactivated for positive or negative acceleration or for maintaining a speed of the transport movement device 14. It is also possible for the portions 50A and 50B to be alternately energized to different degrees. The energization can be controlled for example by a control unit 54 of the transport movement device 14. The control unit 54 can also be provided centrally for a plurality of movement devices 14.

It is possible for example, on a for example long acceleration section (or speed-maintaining section), first of all for only the first portion 50A to be activated or the first portion 50A to be more strongly energized. Subsequently, only the second portion 50B, still on the same acceleration section (or speed-maintaining section), can be activated, or the second portion 50B can be more strongly energized. It is also possible that, on a first acceleration section or speed-maintaining section, only the first portion 50A is activated or the first portion 50A is more strongly energized. On a subsequent second acceleration section or speed-maintaining section, then for example only the second portion 50b is activated, or the second portion 50B is more strongly energized.

The energization or activation of the portions 50A, 50B can occur for example analogously to the exemplary embodiment of FIGS. 1 to 4. For example, an energization of the portions 50A, 50B can migrate or roll and occur dynamically in succession. It is expediently possible for an order in which the portions 50A, 50B are used for accelerating or speed-maintaining to be predetermined. The portions 50A, 50B can, for example alternately, undertake the respectively largest magnetic field generation. As a result, a thermal loading of the short stator 50 can be divided, preferably evened out, over the portions 50A, 50B.

The short stator 50 can expediently be operated with the operating aim of ruling out or at least as far as possible delaying an overloading of a portion or of all portions 50A, 50B of the short stator 16. For this purpose, the short stator 50 can for example be operated such that at least one portion-specific parameter is detected or estimated and the operation of the short stator 50 is adapted such that the parameter does not exceed a limit value. Examples of suitable parameters are portion temperature, portion power output, portion heat generation and/or a thermal loading of the respective portion 50A, 50B.

As described with reference to FIGS. 1 to 5, the techniques disclosed herein can particularly preferably be used in transport methods and transport devices for containers in a container treatment installation. However, it has been recognized that the techniques can also be used for achieving the same advantages in methods and devices for transporting other objects and products as long as the transport movement devices are expediently driven by means of a linear motor system, preferably a long stator linear motor system or short stator linear motor system.

The invention is not limited to the above-described preferred exemplary embodiments. Rather, a multiplicity of variants and modifications are possible which likewise make use of the concept of the invention and therefore fall in the field of protection. In particular, the invention also claims protection for the subject matter and the features of the dependent claims independently of claims to which they refer. In particular, the individual features of independent claim 1 are each disclosed independently of one another. In addition, the features of the dependent claims are also disclosed independently of all the features of independent claim 1.

LIST OF REFERENCE SIGNS

10 Device for transporting
12 Container
14 Transport movement device
16 Long stator
18 Long stator segment
20 Control unit
22 First guide track
24 Second guide track
26 First guide element
28 Second guide element
30 Third guide element
32 Fourth guide element
34 Holder
36 Container treatment installation
38 Run-in star
40 First container treatment device
42 Second container treatment device
44 Run-out star
46 Predetermined functional region
46A-46F Portions
48 Device for transporting
50 Short stator
50A, 50B Portions
52 Permanent magnets
54 Control unit

What is claimed is:

1. A method for transporting objects, comprising:
moving a plurality of transport movement devices along a guide track using a linear motor system, wherein a long stator of the linear motor system has, along a portion of the guide track, a predetermined functional region in which a function assigned to the predetermined functional region is carried out with respect to influencing the plurality of transport movement devices, and
portion-wise varying of a magnetic field generation of the long stator within the predetermined functional region for successive transport movement devices of the plurality of transport movement devices, wherein thermal loading of the long stator within the predetermined functional region is reduce at least portion-wise.

2. The method according to claim 1, wherein:
the predetermined functional region is a predetermined acceleration region in which the plurality of transport movement devices are accelerated positively or negatively; or
the predetermined functional region is a predetermined speed-maintaining region in which one speed of the plurality of transport movement devices is substantially maintained.

3. The method according to claim 1, wherein:
the magnetic field generation is varied portion-wise in such a way that the function assigned to the predetermined functional region is maintained; and/or
the magnetic field generation is varied portion-wise in such a way that a thermal loading of the long stator within the predetermined function region is distributed substantially uniformly and/or between different portions of the predetermined functional region.

4. The method according to claim 1, wherein the predetermined functional region has a plurality of portions, and the magnetic field generation is varied portion-wise in such a way that at least one of the following features is satisfied:
a temperature, a power output, a heat generation and/or a thermal loading of the long stator in the plurality of portions in each case remains below a limit value;
the temperature, the power output, the heat generation and/or the thermal loading of the long stator in the plurality of portions is at least partially evened out;
the plurality of portions, in each case alternately, undertake the largest magnetic field generation and/or the smallest magnetic field generation;
the plurality of portions, in each case alternately, have the largest power output and/or the smallest power output;
a variation of the magnetic field generation in the plurality of portions migrates, rolls and/or occurs alternately successively in a direction towards an end of the predetermined functional region and in a direction towards a start of the predetermined functional region; and
the variation of the magnetic field generation in the plurality of portions occurs in a predetermined order.

5. The method according to claim 1, wherein a speed of the plurality of transport movement devices at a start of the predetermined functional region is substantially identical and/or a speed of the plurality of transport movement devices at an end of the predetermined functional region is substantially identical.

6. The method according to claim 1, wherein the magnetic field generation is varied portion-wise in such a way that:
the successive transport movement devices are accelerated in each case different portions of the predetermined functional region; and/or
the successive transport movement devices experience in each case their strongest acceleration in different portions of the predetermined functional region; and/or
the successive transport movement devices have at least partially different, path-related acceleration profiles in the predetermined functional region.

7. The method according to claim 1, wherein:
the predetermined functional region is formed by a plurality of successive long stator segments of the long stator, and each long stator segment forms a respective portion of the predetermined functional region; and/or the predetermined functional region is a predetermined functional region common to the plurality of transport movement devices; and/or
the predetermined functional region has a predetermined start, a predetermined end, a predetermined position, a predetermined length and/or a predetermined course.

8. The method according to claim 1, wherein the predetermined functional region is a predetermined acceleration region in which the plurality of transport movement devices are accelerated positively.

9. A method for transporting objects, comprising:
moving at least one transport movement device along a guide track using a linear motor system, wherein the at least one transport movement device has a short stator, which is subdivided into a plurality of portions, of the linear motor system; and
portion-wise varying of a magnetic field generation over the plurality of portions of the short stator in successive time intervals for carrying out an identical function with respect to moving the at least one transport movement device, wherein the thermal loading of the short stator is reduce at least portion-wise by the portion-wise varying of the magnetic field generation.

10. The method according to claim 9, wherein the identical function is an acceleration function or a speed-maintaining function.

11. The method according to claim 9, wherein the plurality of portions of the short stator can be or are energized independently of one another.

12. The method according to claim 9, wherein the plurality of portions have a first portion and a second portion, and:
the portion-wise varying of the magnetic field generation occurs in such a way that, in successive time intervals for carrying out the identical function, initially the first portion is activated and the second portion is deactivated and subsequently the first portion is deactivated and the second portion is activated; and/or
the portion-wise varying of the magnetic field generation occurs in such a way that, in successive time intervals for carrying out the identical function, initially the first portion is more strongly energized than the second portion and subsequently the second portion is more strongly energized than the first portion.

13. The method according to claim 9, wherein the magnetic field generation is varied portion-wise in such a way that at least one of the following features is satisfied:
a thermal loading of the short stator is distributed over the plurality of portions;
a temperature, a power output, a heat generation and/or a thermal loading of the short stator in the plurality of portions in each case remains below a limit value;
the temperature, the power output, the heat generation and/or the thermal loading of the short stator in the plurality of portions is at least partially evened out;
the plurality of portions, in each case alternately, undertake the largest magnetic field generation and/or the smallest magnetic field generation;
the plurality of portions, in each case alternately, have the largest power output and/or the smallest power output;
the variation of the magnetic field generation in the plurality of portions migrates;
the variation of the magnetic field generation in the plurality of portions occurs in a predetermined order; and
a thermal overloading of a portion or of all portions of the short stator is delayed or ruled out.

14. A device for transporting objects, comprising:
a guide track;
at least one transport movement device which can be guided along the guide track;
a linear motor system having:
  a long stator which is arranged along the guide track and is designed for driving the at least one transport movement device; or
  at least one short stator which is included in the at least one transport movement device for driving along the guide track; and
a control unit which is configured to carry out a method according to claim 9.

15. The device according to claim 14, wherein the at least one transport movement device comprises a holder which is designed for holding a container, wherein the holder is configured as a container neck holder or a container body holder.

16. The method according to claim 9, wherein the identical function is positive acceleration function.

17. A method for transporting objects, comprising:
moving a plurality of transport movement device along a guide track using a linear motor system, wherein a long stator of the linear motor system has, along a portion of the guide track, a predetermined functional region in which a function assigned to the predetermined functional region is carried out with respect to influencing the plurality of transport movement devices, and
portion-wise varying of a magnetic field generation of the long stator within the predetermined functional region for successive transport movement devices of the plurality of transport movement devices, wherein:
the magnetic field generation is varied portion-wise in such a way that a thermal overloading of a portion or of all portions of the long stator within the predetermined functional region is delayed or ruled out; and/or
the predetermined functional region has an increased thermal loading and/or an increased power requirement on account of the magnetic field generation of the long stator for interacting with the plurality of transport movement devices.

18. A method for transporting objects, comprising:
moving at least one transport movement device along a guide track using a linear motor system, wherein the at least one transport movement device has a short stator, which is subdivided into a plurality of portions, of the linear motor system; and
portion-wise varying of a magnetic field generation over the plurality of portions of the short stator in successive time intervals for carrying out an identical function with respect to moving the at least one transport movement device, wherein the thermal loading of the short stator is distributed substantially uniformly over the plurality of portions.

* * * * *